No. 843,599. PATENTED FEB. 12, 1907.
C. S. HAMMATT.
PROCESS OF DISTILLING WOOD.
APPLICATION FILED JUNE 12, 1906.
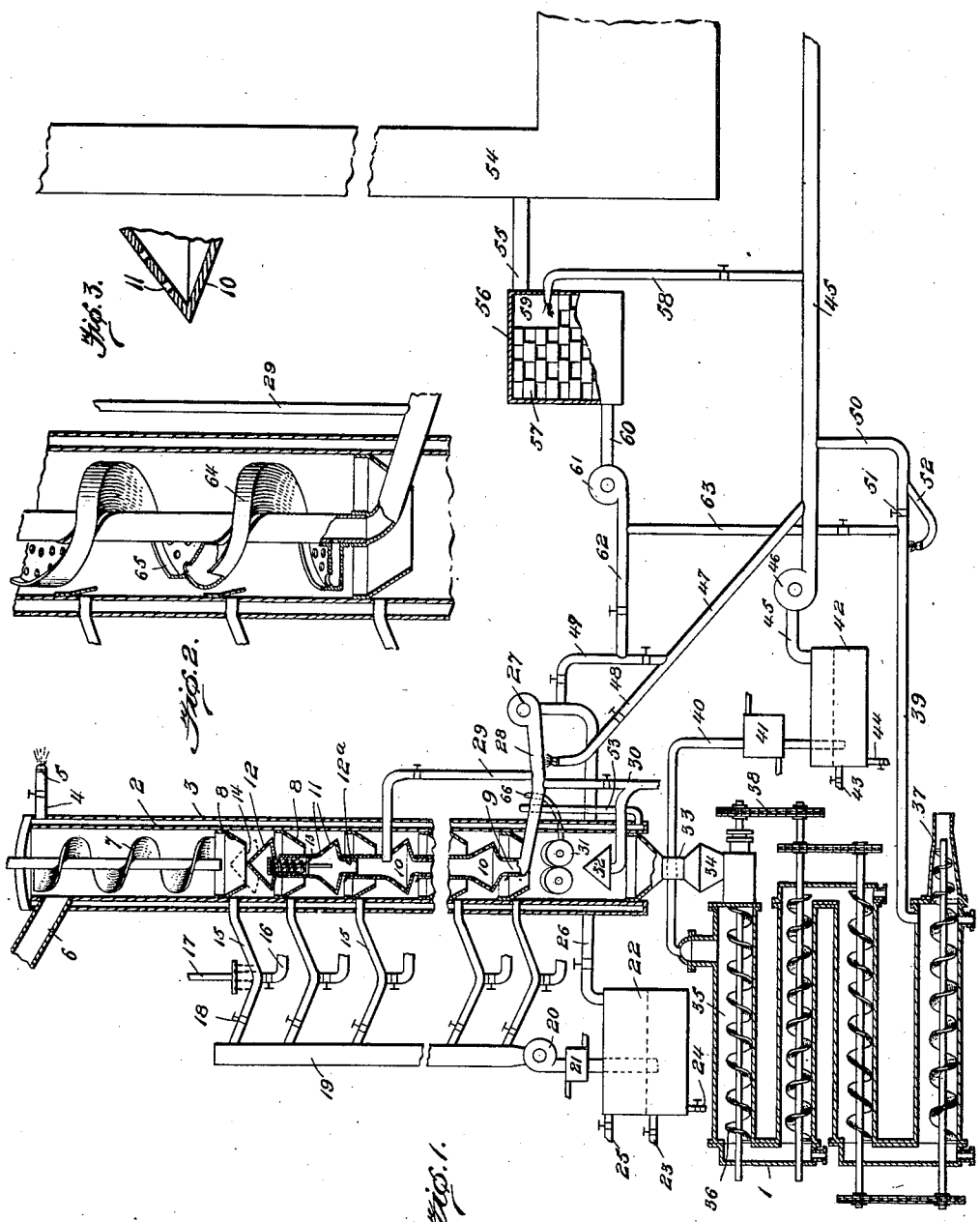
WITNESSES:
INVENTOR
Clarence S. Hammatt,
BY
Marble & McElroy
Attorneys

UNITED STATES PATENT OFFICE.

CLARENCE S. HAMMATT, OF JACKSONVILLE, FLORIDA.

PROCESS OF DISTILLING WOOD.

No. 843,599. Specification of Letters Patent. Patented Feb. 12, 1907.

Application filed June 12, 1906. Serial No. 321,379.

*To all whom it may concern:*

Be it known that I, CLARENCE S. HAMMATT, a citizen of the United States, residing at Jacksonville, in the county of Duval and State of Florida, have invented a certain new and useful Process of Distilling Wood; and I do hereby declare the following to be a full, clear, and exact description of the same, such as will enable others skilled in the art to which it appertains to make and use the same.

This invention relates to processes of distilling wood, and consists in a method of differentially extracting natural volatile constituents of the wood and pyrolytic products of the same by a series of distillations, each carried out under appropriate conditions by means of circulating bodies of indifferent gases of regulated temperature and composition, all as more fully hereinafter set forth, matters of novelty being particularly pointed out in the appended claims.

The coniferous woods contain the valuable constituents which are found in the gum-turpentine oozing forth in tapping the live trees in the customary manner; but it has hitherto proved difficult to extract turpentine and rosin from the wood by a simple, ready, and economical method delivering these bodies in a commercially pure and commercially satisfactory form. Most of the methods heretofore proposed depend upon distillations in one form or another; but in such distillations for reasons hereinafter appearing it has proved impractical to avoid the presence in the distilled product of decomposition products of turpentine, of rosin, or of the wood. Generally, indeed, destructive distillation of wood and extraction of the turpentine of wood have been performed in one and the same operation. The wood-turpentine of the trade, therefore, usually has an unpleasant smell, from which it is nearly impossible to free it. Neither has it properties exactly like those of the ordinary turpentine from gum-turpentine. In most of these prior methods the wood has been heated in mass. Under these conditions it is difficult to heat it uniformly and to an exact temperature. Both because of the low conductive power of wood for heat and because the specific heat of water being very high the evolution of steam in the mass tends to chill it locally, heat does not permeate the mass well. In the effort to obtain sufficient heat in interior portions other portions of the mass are invariably overheated, with the result of the stated decomposition. Efforts have been made to remedy this by distillation in a current of steam; but this apart from the expense of generating the steam is objectionable for a number of reasons. One is that it adds inordinately to the amount of condensate and another is that it seems to exercise a catalytic or other decomposing action upon the rosin, forming rosin-oils, and it seems also to exercise a similar destructive action upon the turpentine. Further, in order to secure a perfectly even temperature throughout a mass of wood it would be necessary to employ an amount of steam quite impossible in practice. Wood naturally contains an enormous amount of water even when dry, and this water, taken together with the amount of steam which would be necessary for such even heating throughout, would form an enormous quantity of liquid to be handled by the turpentine-condensers.

In the present invention evenness of heating is secured by the use of rapidly-circulating masses of indifferent permanent gases of the character hereinafter described, which are able to carry heat throughout the mass of wood to be treated without burdening the turpentine-condensers with an inordinate bulk of condensate. Preferably these circulating gas masses are used in connection with thin traveling layers of sawdust, small chips, or other comminuted form of wood passing through a zone of increasing heat, the gas being preferably transmitted transversely to the traveling layer. Further, in order to avoid the formation of decomposition products the distillation is divided into a plurality of different stages, each performed under the most appropriate conditions. The distillation of turpentine and other natural volatile products of the wood is completely separated from the destructive distillation, and such turpentine distillation is also preferably split up into a number of stages.

By using transverse gas-currents which each pass through the traveling layer of sawdust at one point and are then immediately removed from the still, as is done in the preferred form of this invention, the turpentine evolved at any such point can suffer no decomposition. It does not travel forward with the wood, as would be the case if other than transverse currents were used, and so become overheated or otherwise changed. Its existence in the form of vapor is, in fact, but momentary. It is removed by the gas-current at the moment and at the point of volatilization and can be immediately condensed. Again, since the traveling layer of sawdust in passing through the zone of increasing heat described is progressively increasing in heat at each successive point the vapors evolved are of different character. Therefore by using a succession of transverse gas-currents at a number of successive points different products can be obtained by running each such gas-current through a separate condensing apparatus, or, if desired, the condensates from a number of such transverse currents or from all of them may be united to secure particular commercial grades of turpentine. It is obvious that the described method offers considerable flexibility in the matter of securing such grades.

In this fractional turpentine distillation destructive distillation or pyrolysis is precluded by regulation of the conditions, and thus products drawn off from zones of comparatively low temperature are of course free of pyrolytic decomposition products. Condensed products from such zones may easily be obtained of the character of any desired grade of the commercial turpentine, being, in fact, merely the natural turpentine.

The several gas-currents after leaving the wood and passing through the condenser or condensers to be stripped of their condensable load may be returned to serve anew. Preferably this is done by causing the gas to circulate in closed circuits, though fresh gas masses may of course be used, if so desired.

For the gas-currents any convenient nonoxidizing gas may be employed, such as products of combustion, limekiln gases, wood-gas, &c. While some steam may be used as a component of the current, it is in general not desirable to do this. The wood distilled itself contains an excess of water ordinarily. When products of combustion, limekiln gases, and similar gaseous mixtures are used, the contained free oxygen should be removed, as its presence leads to resinification and alteration of the turpentine, &c. It is very desirable that the gas-current should contain no free oxygen. In using products of combustion, therefore, they are preferably admixed with a little combustible gas and heated. They may, for instance, pass into a checker-work chamber, where the free oxygen and the combustible gas will react on each other. Excess of combustible gas does no harm. The combustible gas evolved in the destructive distillation of wood is quite suitable for this purpose.

Whatever the particular gas employed, it should be heated before use to an appropriate temperature. The mass of comminuted wood, which is preferably pine sawdust, should be contained in a heat-insulated still to aid in procuring even temperatures. The particular gas temperature employed will depend on the particular wood and the rapidity of circulation employed, as well as upon the grade of the product desired, and is best controlled by observation of the quantity and quality of product delivered at the condensers. Rapidity of gas circulation and sheer temperature are reciprocal factors to a large extent in recovering turpentine. While turpentine has a high boiling-point around 168° centigrade, it has a great vapor tension at temperatures far below that point and may be easily evaporated and recovered by circulating gas masses at temperatures even below 100°. Ordinarily it is desirable to work at temperatures in the neighborhood of 100° for fine grades, though 120° and 150° may also be used. The higher the temperature the more rapid the work with the same speed of circulation.

After complete removal of the turpentine and other volatile constituents of the natural wood the wood is ordinarily submitted to destructive distillation, though the process may be stopped after such removal and the purified wood used for some purposes for which it is eminently suitable, such as the manufacture of gunpowder, blasting-powder, as an absorbent for nitroglycerin, as a fuel, &c.

In conducting destructive distillation the wood is also preferably treated in a current of hot neutral gas. Products of combustion may be here used also; but the permanent gases evolved in the distillation itself are likewise suitable. The evolved distillation products are passed through a condenser in the ordinary manner and the acetic acid, methyl alcohol, tar, &c., separated out, as usual, and a small fraction of the gases reheated and led back through the charring wood.

In the accompanying more or less diagrammatic illustration I have shown one type of apparatus of the many adapted to perform my process.

In this illustration, Figure 1 is a view, partly in vertical section and partly in elevation, of a complete apparatus. Fig. 2 is a similar view of a modified detail of Fig. 1, and Fig. 3 is an enlarged detail view of the cones in Fig. 1.

In Fig. 1, 1 indicates as a whole the portion of the apparatus designed for destructive distillation of wood, hereinafter called, for the sake of brevity, the "destructive still." 2 indicates as a whole the portion of the apparatus intended for regaining valuable natural constituents of the wood, which may be similarly called the "turpentine-still."

The turpentine-still comprises an upright shaft or column, which may be of any suitable material, but is here shown as constructed of sheet-iron. However, since no heat transmission through its walls is necessary or desirable it may be made of any other material—such, for instance, as brickwork, terra-cotta, &c. Made of iron, as shown, it is preferably surrounded by a heating-casing 3, provided with a valved outlet-pipe 4, which when combustible gas is used as a heating agent may be supplied with a burner 5. Feed-inlet 6 serves for the introduction of raw material, usually with this apparatus pine sawdust, chips from a "sawmill-hog," &c. Interiorly in its upper portion the shaft is provided with an ordinary feed-screw 7, serving to force the sawdust downward. Below this screw the wall of the shaft is provided with a number of annular deflecting-hoods 8, arranged at intervals. Rising in the center of the shaft is a gas-conduit 9, provided with a number of conical-topped enlargements 10, provided with fine perforations 11 on their upper surfaces. The uppermost of these cones 12 is not perforated and is made with a depending portion 12ª, forming a slip-joint in the top of the gas-conduit, which itself is preferably made of a number of sections with slip-joints. Seated on a cross-bar 13 in the gas-conduit is a spring-controlled pin adapted to force said cone upwardly against the topmost deflector 8 and close and seal the opening 14, as shown in dotted lines. It is obvious that with this structure the size of the opening will adjust itself to the amount of sawdust descending. The sawdust thereby forms a seal against ascent of gas or vapors. Opening under each of the deflectors is an outlet-pipe 15, the deflectors serving to shield it against entrance of sawdust. Each of these pipes is provided with a depressed portion, opening from which is a valved pipe 16, leading off to means for withdrawing condensates. (Not shown.) A water-pipe 17 provides for a drip of water on the whole series of these outlet-pipes, thereby serving to condense vapors therein. Beyond the depression each of the outlet-pipes is provided with a valve 18. By closing this the condensate from each section may be diverted separately and recovered, if desired. All the outlet-pipes, however, also communicate with a common down-pipe 19, provided with a suction-fan 20 and condenser 21 and depending through the top of a seal-tank 22. This tank is provided with a turpentine draw-off 23, a water-outlet 24, and a relief-pipe 25, which may be used to adjust pressures in the system. From the top of the seal-tank rises a valved gas-outlet pipe 26. This pipe communicates, through fan 27, with the central gas-conduit by means of pipe 28, passing through the wall of the shaft. It will be seen that by this structure gas is passed into the gas-conduit, out through the perforations of the cone and through the layer of sawdust sliding down the same, through the gas-outlet pipe, and thence through the condenser, seal-pot, and fan back into the conduit, circulating in closed circuit. As the sawdust descending between the deflectors and the next adjacent portion of the gas-conduit forms a layer completely filling the opening therebetween, there is no tendency for the gas flowing out of the gas-conduit into a section of the still to rise into the next upper section or descend into the next lower. By this simple means each section of the still practically forms an independent still, and, as in the upper sections a drying action takes place, due to the expulsion of water, there is a progressive increase in heat from the upper to the lower sections, using the same body of hot gas to feed the bottom of the gas-conduit; but since the rate of increase is apt to be somewhat great it is preferable to use a valved auxiliary pipe 29, opening into the upper part of the gas-conduit to supplement the heat of the gases rising through the conduit. In the first section the absorption of heat is inordinately great, since it is here that the bulk of the water leaves the wood. The sawdust is preferably well dried before entering; but it will still contain much water.

The gas-inlet pipe to the lower sections is provided with a depressed portion tapped by a valved rosin-pipe 30, leading downward to a seal-pot. (Not shown.) Any rosin which enters the perforations in the cones will flow downward into this rosin-pipe. Special openings may be provided in the conduit for rosin-inlets.

Below the base of the gas-conduit is a pair of heated spirally-grooved grinding-rolls 31, set at an angle and perforated to allow escape of gas. Very hot gas is fed into these rolls by pipe 66 and serves to volatilize rosin as such to a great extent, the gas-current being very rapid, and therefore acting as an efficient distilling agent for this purpose. Whatever rosin and rosin-oils escape here are condensed and separately recovered from the lowermost vapor-outlet 15. By inclining the rolls melted rosin squeezed out of the wood and not distilled flows along them and drops on the perforated receiver 32, flowing thence into the rosin-pipe 30. Preferably the temperature of the gas fed into this lower or rosin section of the still is as hot as may be without causing destructive distillation of the wood, as would be shown by condensation of tarry products.

From the bottom of the turpentine-still depends a coned and gated outlet 33, delivering treated wood into the receiving-hopper 34 of the destructive still.

The destructive still consists of a number of superimposed cylindrical chambers 35, communicating at alternate ends and each provided with a screw conveyer 36. The treated wood is forced through these chambers and finally leaves the last as charcoal through the coned delivery 37, which acts as a gas-seal. Appropriate drive machinery 38 serves to rotate the screw conveyers.

At or near the charcoal-delivery end is a gas-inlet pipe 39. Gas introduced into this flows successively through the chambers against the forward travel of the wood and finally exits through a dome and pipe 40. This latter pipe passes through a condenser 41 and thence downward into a seal-pot 42, wherein condensed bodies accumulate and are drawn off from time to time through valved pipes 43 and 44, according to their specific gravity. From the top of this seal-pot leads a main gas-pipe 45 for carrying off the combustible incondensable gases formed in destructive distillation. Fan 46 serves to maintain flow. Beyond the fan is a valved pipe 47, tapping the main gas-pipe and provided with a branch pipe 48, ending in a gas-jet under the gas-inlet pipe of the turpentine-still and serving to furnish heat to the same. Another valved branch 49 taps the said inlet-pipe and serves to replenish the gas therein when circulating gas masses of the still are composed of combustible gas from the destructive distillation. Another valved pipe 50 taps the main gas-pipe and delivers combustible gas into the destructive still through its inlet-pipe 39. On the hither side of the valve 51 leads off a branch pipe 52, ending in a gas-jet under said inlet-pipe 39, which serves to furnish heat to its contents.

From the inlet-line 28 of the turpentine-still leads a gas-pipe 53, which enters the jacket of the said still and serves to furnish hot gas as a heating and heat-insulating means.

When the demand for the combustible gas of the destructive still is great enough to make it desirable to economize in it or where an atmosphere of different composition is desired for various chemical reasons, products of combustion from chimney-stack 54 may be used. These depart therefrom through pipe 55 and enter a structure 56, built generally like a regenerator and containing bricks or similar masses of resistant and heat-storing material 57. These serve to make uniform the temperature of the products of combustion. As such products, however, generally contain an excess of free oxygen and as this oxygen exercises a detrimental effect where fine grades of turpentine are desired, the structure shown is provided with a valved pipe 58, tapping the main gas-pipe and delivering a small portion of combustible gas into the regenerator-chamber 59. Here this mixes with the products of combustion and in passing through the hot checker-work effectually serves to remove free oxygen. Any slight excess of combustible gas does no harm and is usually insignificant in amount. From the regenerator the products leave through pipeline 60, containing fan 61. A valved branch 62 leads from this into the gas-replenishing pipe 49 of the turpentine-still. Another valved branch 63 leads down to the gas-inlet 39 of the destructive still beyond the valve in said inlet.

By the described piping systems it is seen that either or both stills may be fed with purified products of combustion, with ordinary products of combustion, or with combustible gas from the destructive still. Ordinary products of combustion—i. e., those with some oxygen—are ordinarily not desirable; but they may be used in some cases.

In Fig. 2 a section of the turpentine-still is shown in which all the elements are the same as in the structure of Fig. 1, save that the central gas-conduit is here shown as a rotating hollow screw 64, provided with a flange 65 to retain sawdust in the helical pathway. The upper surface of the screw-blade is perforated to permit feeding of hot gas through the descending sawdust. Down this helical pathway the sawdust travels by gravity, the screw being kept in slow rotation upon the bearing 67.

Using the structure shown the treatment of the wood is performed in two distinct stages, the volatile natural constituent of the wood being first expelled and then the wood subjected to pyrolytic or destructive distillation. The first stage is again subdivided into as many as there are sections in the particular length of turpentine-still used. Both distillations are performed in the presence of circulating gas masses composed of indifferent gas, these masses preferably circulating in closed circuits. In the turpentine-still the wood is caused to progress forward in a relatively thin layer through a heated zone of increasing heat, and at various points it is subjected to the volatilizing influence of a transverse gas-current passed through it, immediately removed, stripped of its condensable constituents, reheated, and reused. The circulation is kept relatively rapid, and thereby the volatilizing and heating effect of the current is raised to a maximum, and, as in the preferred form of the invention the gas is free both from free oxygen and any great amount of water-vapor, there is no deleterious effect on the turpentine or rosin. The turpentine is in the vapor form but for a fraction of a second and cannot be damaged by overheating. Further, since it is condensed under exclusion of air it does not suffer damage by oxidation.

The rapid current of hot gases of exact temperature passed through the destructive still furnishes a most convenient and ready method of heating the wood without local overheating, rendering possible the production of high-grade distillation products, and since such gases are preferably free from oxygen there is no loss of such delicate bodies as acetone, methyl alcohol, &c. The relative proportions of the different constituents recovered from the destructive still will vary with the particular gas mass used. With the combustible gas there is frequently a tendency to favor the formation of acetic acid, while with products of combustion relatively more acetone is formed.

The pressure maintained within either or both stills may be above, below, or at atmosphere, as desired. Preferably, however, it is at or slightly above atmospheric pressure, as this prevents infiltration. Reduced pressure promotes the evolution of turpentine and also aids in the destructive distillation; but the same effect may be gained by increasing the rapidity of the circulating gas-current, as a turpentine-free gas-current, for example, absorbs turpentine very readily and at low temperatures. The same is true in the rosin distillation, where a very rapid hot current of indifferent gas carries over much of the rosin unchanged. The rosin condensed from this distillation, being free of dirt and oxidation products, is of prime quality. In rosin distillation the gas-current may be at a temperature of about 200° centigrade with advantage.

The condensed products from the first two or three sections of the turpentine-still contain most of the water of the wood, but carry also some turpentine of good quality. It has, however, frequently a woody smell, the small amount of aromatic constituent which gives pine-wood its odor being carried over with the water. The turpentine from the next few sections is large in quantity and good in quality. That from the lowermost sections, at the point where the heat is raised to distil rosin, usually contains some rosin-oil; but the products from all these sections can be united to form a good commercial grade of turpentine. For finer qualities it is advisable to collect the distillates separately, uniting such condensates as may be desirable to secure a given grade.

The apparatus shown may be indefinitely modified.

What I claim is—

1. The process of recovering turpentine from coniferous wood which consists in sweeping a body of heated non-oxidizing indifferent permanent gas, maintained at a temperature too low to cause destructive decomposition of wood or turpentine, in a closed circuit over said wood, to and through a condenser, through a reheater and back into contact with the wood.

2. The process of recovering valuable products from wood which consists in distilling wood in an atmosphere of indifferent non-oxidizing permanent gas at a temperature too low to cause destructive decomposition of natural constituents to remove such natural constituents, and in then destructively distilling said wood.

3. The process of recovering valuable products from wood which consists in producing a thin traveling layer of such wood progressively passing through a plurality of closed heating-chambers of progressively-increasing temperature and in each such chamber contacting with it a current of gas circulating in a closed circuit, said closed circuit including a condenser.

4. The process of recovering volatile oils from wood which consists in sweeping a current of heated wood-gas at a temperature too low to cause destructive decomposition of wood or oil, in a closed circuit over said wood, to and through a condenser, through a reheater and back into contact with the wood.

5. The process of recovering volatile oils from wood which consists in producing a thin traveling layer of such wood and passing transversely through such layer at a plurality of points gas-currents circulating in closed circuits to and through a condenser each succeeding gas-current being of a higher temperature, through a reheater and back through the wood.

6. The process of recovering turpentine from wood which consists in transversely passing through a thin traveling layer of wood a plurality of isolated gas-currents of different temperatures at different points along its line of travel.

7. The process of recovering valuable products from wood which consists in distilling off natural volatile constituents by means of a current of heated non-oxidizing indifferent, permanent gas circulating past said wood in closed circuit, and in then destructively distilling said wood.

8. The process of recovering valuable products from wood which consists in distilling off natural volatile constituents by means of a rapid current of heated non-oxidizing indifferent permanent gas circulating past said wood in a closed circuit and in then destructively distilling said wood by a current of heated gas also circulating past said wood in closed circuit.

9. The process of fractionally recovering valuable constituents of wood which consists in distilling off natural volatile constituents of said wood by a plurality of isolated successive currents of indifferent gases, successively increasing in heat, circulating past said wood in closed circuits, and in then destructively distilling said wood by a heated current of indifferent gas, also circulating past said wood in closed circuit.

10. The process of regaining turpentine and rosin from wood which consists in stripping said wood of turpentine by a current of heated non-oxidizing permanent indifferent gas circulating past said wood in closed circuit, and in then transmitting past said wood another current of hotter non-oxidizing permanent indifferent gas circulating in closed circuit, both said currents being maintained at a temperature too low to destructively decompose the wood.

11. The process of regaining rosin from wood which consists in transmitting past said wood a rapid current of heated indifferent gas at a temperature just below the decomposing-point of rosin.

12. The process of recovering valuable products from wood which consists in transmitting said wood down a heated shaft in annular layers, and passing through the wood at different points along its line of travel, a plurality of transverse currents of heated indifferent gases.

13. The process of recovering valuable products from wood which consists in passing said wood through a plurality of heated chambers isolated from each other, each succeeding chamber being at a higher temperature though at a temperature below the decomposing-point of said wood, and in separately collecting the vapors evolved from such wood in each chamber.

14. The process of recovering valuable products from wood which consists in passing said wood through a plurality of heated isolated chambers at temperature below the decomposing-point of wood to strip said wood of turpentine treating it in each such chamber with a current of indifferent gas, and in then pressing the heated wood to extract rosin.

15. The process of recovering valuable products from wood which consists in passing wood through a series of compartments having isolated inlets and outlets, whereby the wood itself substantially seals such inlets and outlets against gas-passage, in passing heated gas through each compartment separately, and separately collecting the vapor-charged gas from each compartment.

16. The process of recovering valuable products from coniferous wood which consists in stripping the same of turpentine with currents of heated inert gases, recovering rosin at a higher temperature by distillation with inert gas-currents and by pressure, and in then destructively distilling the residual wood.

17. The process of recovering valuable products from wood which consists in transmitting said wood in a moving layer through a series of heated zones of successively-increasing temperature, stripping it of volatile natural constituents in each such zone by a current of inert gas of appropriate temperature, and in then transmitting the so-treated wood through a zone of sufficient temperature to char it, removing produced volatile bodies by another current of inert gas of appropriate temperature.

18. The process of recovering valuable products from wood which consists in transmitting said wood in a moving layer through a series of heated zones of successively-increasing temperature, stripping it of volatile natural constituents in each such zone by a current of inert gas of appropriate temperature traveling in closed circuit through a condenser, and in then transmitting the so-treated wood through a zone of sufficient temperature to char it, removing produced volatile bodies by another current of inert gas of appropriate temperature traveling in closed circuit through a condenser.

In testimony whereof I affix my signature in the presence of two witnesses.

CLARENCE S. HAMMATT.

Witnesses:
H. M. MARBLE,
K. P. McELROY.